Sept. 11, 1951  H. GRANDGIRARD  2,567,703
CENTRIFUGALLY BALANCED VALVE FOR GIVING
CLUTCHES OVERLAPPING ENGAGEMENTS
Filed Jan. 26, 1946  3 Sheets-Sheet 1
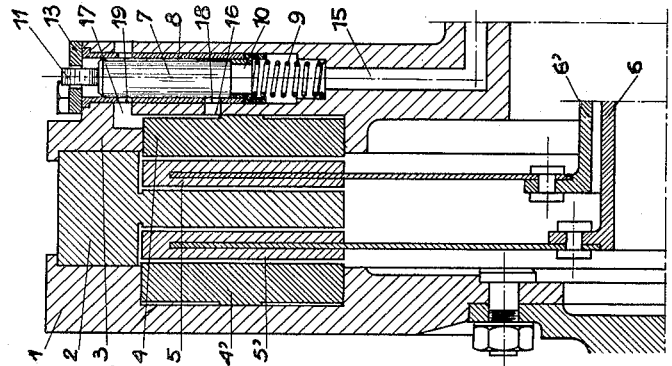
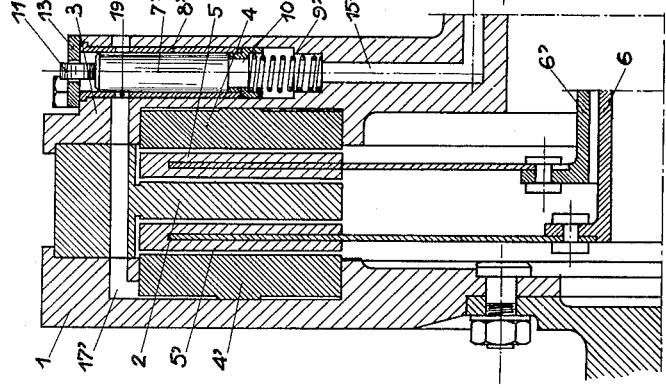
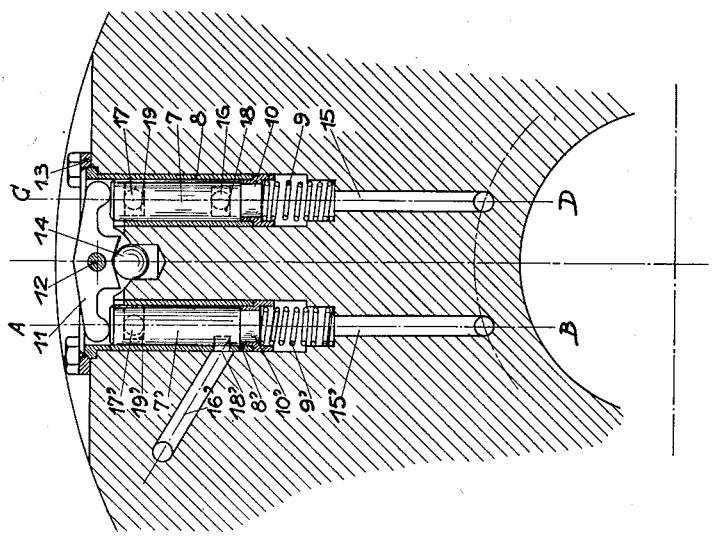
Inventor
HENRI GRANDGIRARD
By Haseltine Lake & Co.
AGENT Sept. 11, 1951 H. GRANDGIRARD 2,567,703
CENTRIFUGALLY BALANCED VALVE FOR GIVING
CLUTCHES OVERLAPPING ENGAGEMENTS
Filed Jan. 26, 1946 3 Sheets-Sheet 2
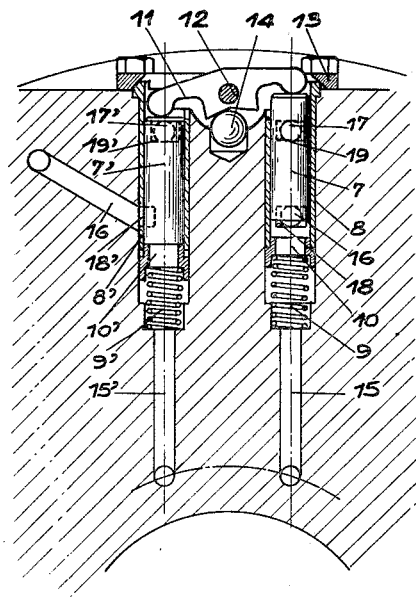
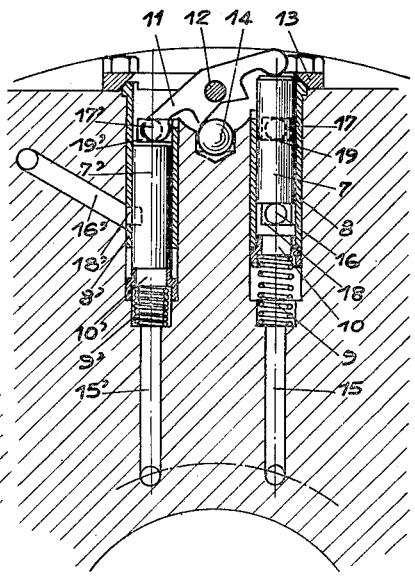
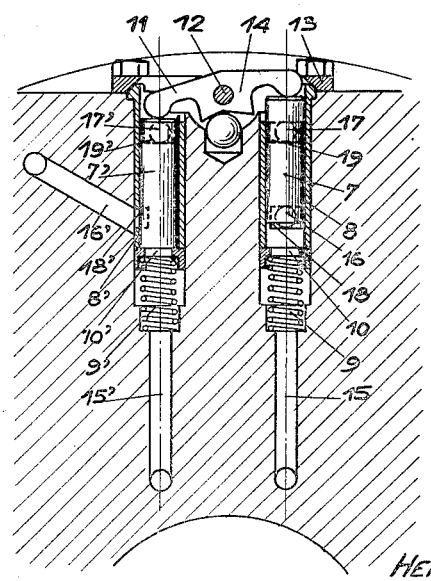
Inventor
HENRI GRANDGIRARD
By Haseltine, Lester & Co.
AGENT

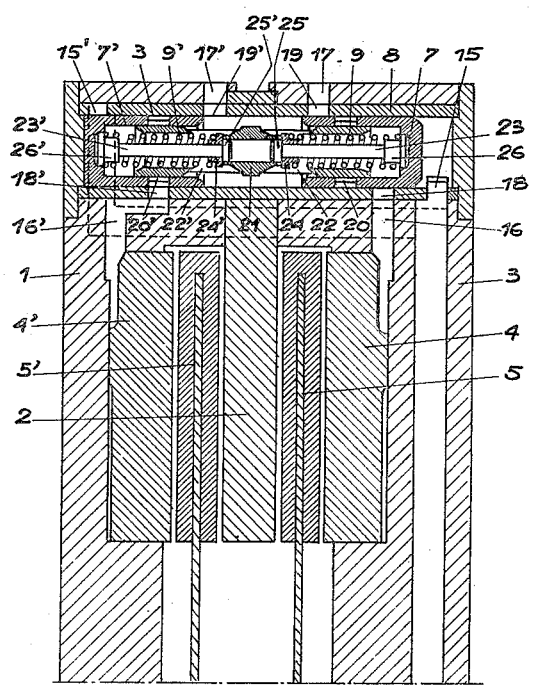

Patented Sept. 11, 1951

2,567,703

UNITED STATES PATENT OFFICE 2,567,703

CENTRIFUGALLY BALANCED VALVE FOR GIVING CLUTCHES OVERLAPPING ENGAGEMENT

Henri Grandgirard, Puteaux, France, assignor to Société des Brevets Kegresse, S. E. K., Paris, France, a French corporation Application January 26, 1946, Serial No. 643,807 In France December 23, 1943

Section 1, Public Law 690, August 8, 1946 Patent expires December 23, 1963

4 Claims. (Cl. 192—87)

1

In the art of clutches having hydraulically engaged discs, numerous forms of construction of slide valves or lift valves are known which control both the introduction of the actuating fluid into, and the emptying of said fluid from the chamber provided behind the piston of the presser plate of the clutch.

These various devices, the operation of which is quite satisfactory for the control of a single clutch, are unsuitable for the distribution of the fluid in a group of two clutches which have to operate alternately, for example in a multiple gear transmission, wherein one of the clutches controls the gears for the second and fourth shifts, and the other the gears for the first and third shifts. In order to obtain correct operation of such a clutch mechanism, it is absolutely necessary to engage the disc of the clutch corresponding to the gear which it is desired to couple before releasing the disc of the clutch corresponding to the gear which it is desired to uncouple. The emptying of each pressure system must therefore be controlled by the filling of the other.

The present invention has for its object a combination of slide valves which meets this requirement. It is essentially characterised by a group of two twin slide valves each controlling one of the two clutches and coupled together mechanically by coupling means which reverses the movement of one relatively to the movement of the other.

In order that the invention may be clearly understood and readily carried into effect, the same will now be more fully described with reference to the accompanying drawings, in which two examples of construction have been shown. In said drawings:

Figure 1 is a transverse sectional view through two radial slide valves, which are coupled together according to the invention and occupy their neutral positions;

Figure 2 is a longitudinal sectional view on line A—B of Fig. 1 through the valves and the distribution ducts of one of the clutches;

Figure 3 is a similar longitudinal sectional view on line C—D of Fig. 1 through the valves and the distribution ducts of the second clutch;

Figure 4 is a similar sectional view to that of Figure 1, showing the device in the position which it occupies at the commencement of filling the pressure system of the first clutch;

Figure 5 is again a similar sectional view showing the device in the position which it occupies on complete filling of the pressure system

2 of the first clutch and emptying of that of the second clutch;

Fig. 6 is a view similar to that of Figure 4, and shows an improved form of realisation of the same device.

Figure 7 is a longitudinal sectional view through a third form of construction, having axial slide valves, said slide valves being shown in their neutral positions.

The group of two clutches includes the driving flywheel 1, fixed plate 2, cover 3, annular pistons 4 and 4' for effecting engagement of the discs, and clutch discs 5 and 5' carried by the concentric driven shafts 6 and 6'.

The distribution of the fluid, in the first example of construction (Figures 1 to 5) is controlled by two similar valves 7, 7' arranged in guides 8, 8'; retraction of the valves to the neutral position is effected by return springs 9, 9', which bear on the valves through bushings 10, 10', adapted to abut against the guides in order to keep the springs under a predetermined load.

According to the invention, the valves are mechanically interconnected by a rocker 11, which is articulated at its center on a pivot 12 carried by a bridge-piece 13; the lower central part of the rocker has the shape of a wide inverted V on the inclined face of which there is adapted to bear a ball 14, the function of which will be specified hereinafter. The fluid flows to the valves through the supply ducts 15, 15', its distribution being effected by ducts 16, 16' for filling and 17, 17', for emptying respective pressure systems of the clutches, said ducts respectively opening into the orifices 18, 18' and 19, 19' of the valve guides.

The operation of this arrangement is illustrated by Figures 1, 4, 5.

In Figure 1, the mechanism is in the neutral position, all the ducts, both for filling and for emptying, being closed by the valves; this is the position of equilibrium, both when stationary and when running, the supply ducts 15 or 15' being isolated from the source of pressure fluid.

In Figure 4 the supply is effected by the duct 15 corresponding to the chamber located behind the piston 4, the valve 7 having been forced back by the fluid so as slightly to uncover the orifice 18 and also compressing the spring 9' of the other valve, through the rocker 11 and the valve 7', which still closes the emptying orifice 19'. Through the duct 16, the liquid fills the chamber behind the piston 4. As this filling operation is effected under very low pressure, the valve 7 will remain in the position shown until the instant when, the chamber being full and the corresponding clutch disc 5 pressed by the piston 4, the pressure will increase and will reach a sufficient value completely to compress the spring 9'. The arrangement then takes up the position shown in Figure 5, in which the valve 7 completely uncovers the filling orifice 18 and, through the intermediary of the rocker 11, pushes back the valve 7', which thus uncovers the orifice 19' communicating with the emptying duct 17' behind the piston 4', which emptying could only take place after the pressure determined by the spring 9' has been built up in the pressure system of the clutch corresponding to the piston 4.

However, as soon as the mechanism has left the neutral position, the valves are unbalanced by centrifugal force, owing to the inequality of their distance from the axis of rotation, and this unbalancing could, at certain speeds, completely upset the distribution cycle provided, or prevent the return of the mechanism to the neutral position, at the instant when the supply of pressure fluid ceases, the springs 9 and 9' being too weak to overcome the difference of the centrifugal forces acting on the valves.

According to the invention, re-establishment of the balance is effected by the ball 14. Its weight and the inclination of the inverted V-shaped surface on which it bears due to the centrifugal force are so calculated that, in all positions occupied by the valves, the centrifugal force acting on said ball creates on the rocker 11 a couple which is equal and in the opposite direction to that due to the difference of the centrifugal forces acting on these two valves.

When the supply of pressure fluid ceases through the duct 15, the spring 9' retracts the whole arrangement to the neutral position. As the two valves then close the discharge and filling orifices, the pressure will be maintained behind the piston 4, and the clutch will continue to fulfill its function as long as the actuating fluid has not been supplied under pressure behind the piston 4' and, consequently, will not have moved the valves 7' and 7 in such a manner that the valve 7 uncovers the discharge orifice 18 corresponding to the chamber of the piston 4.

According to the form of operation described above, each of the two supplying and emptying valves can move, under pressure of the actuating fluid, only by compressing the retracting spring of the other valve, to which it is coupled. The force due to the pressure of the fluid on the valve must therefore always be greater than the force of said spring.

It is an object of the improvement shown in Figure 6 to ensure its satisfactory operation, even in the cases in which the normal pressure of the actuating fluid is low.

According to this second embodiment, a certain amount of freedom of movement is provided for each of the two valves relatively to the other, so that each valve may commence uncovering of the supply duct which it controls without thereby compressing the spring of the other valve.

Figure 6 shows that a certain amount of play is provided between the lower face of the valves 7, 7' and the bushings 10, 10', which act as stops for the springs 9, 9'. In these conditions, the operation of the device thus improved is as follows:

The fluid being supplied, for example, through the duct 15, the valve 7 is freely moved by the fluid until the instant when, through the rocker 11, it brings the valve 7', which still closes the discharge orifice 19', into contact with the bushings 10' of the spring 9'. The liquid, by simply flowing through the duct 16 which is then partially uncovered, fills the chamber located behind the piston 4. When the required pressure has been built up in said chamber, the fluid pushes the valve 7 further in an upward direction. Through the rocker 11 and of the valve 7', the spring 9' is then compressed, and the whole mechanism takes up the position shown in Figure 5. The valve 7 then completely uncovers the orifice 18, whereas the valve 7' completely uncovers the orifice 19' for emptying the chamber located behind the piston 4'.

The remainder of the operation is identical with that of the mechanism first described.

The foregoing description corresponds to an embodiment using radial valves arranged in the cover 3 of the clutch. Figure 7 shows an arrangement fulfilling the same function in the case of distribution by means of axial valves located at the periphery of the clutch. The principle of the operation is the same as in the previously described embodiment, but the two valves are coupled together, in this case, no longer by a rocker, but by springs which at the same time act as retracting springs.

In this further arrangement, the valves 7, 7' are hollow and are provided with annular grooves 20, 20' communicating with the interior of the valves through appropriate openings. They are both slidably mounted in a single guide 8 provided with orifices 15, 15' communicating with the inlet ducts for the pressure fluid, orifices 18, 18' communicating with the distributing ducts 16, 16' which open into the chambers of the pistons 4, 4', and orifices 19, 19' communicating with the discharge ducts 17, 17' of these same chambers. The two valves also slide on a movable slide valve 21 provided with machined portions 22, 22'.

In the inoperative position shown in Figure 7, the valves are held apart by the springs 9, 9' which are themselves held compressed between the two heads 25, 25' and 26, 26' of the rods 23, 23', each spring bearing on one side directly against the outer head 26, 26' and on the other side against rings 24, 24' which slide on the rods and abut against the inner heads 25, 25' of the latter. If the pressure fluid is supplied through the duct 15, the valve 7 will be moved towards the left and will partly uncover the orifice 18. The actuating fluid will flow through the duct 16 behind the piston 4, which will compress the corresponding clutch disc 5. The slide valve 21 will also be pushed towards the left a distance equal to only half of the travel of the valve 7, owing to the position of equilibrium of said slide valve between the two springs 9, 9' which, since they are of equal strength, share between them the total travel of the valve 7. Consequently, the machined portions 22' of the slide valve will not register with the groove 20' of the valve 7' and discharge from the chamber behind the piston 4' cannot take place as long as the pressure for which the springs are calculated has not been built up behind the valve 7, and consequently behind the piston 4, which is in this case tightly pressed against the clutch disc 5.

Only when such pressure is attained, will the valve 7 be forced to the end of its travel and the machined portions 22' of the slide valve 21, which have come into register with the groove 20', will place the rear of the piston 4' in communication with the outside through the duct 16', the orifice 18', the groove 20', the orifice 19' and the duct 17', thereby releasing the clutch disc 5'.

If the supply of pressure fluid through the duct 15 is stopped, the whole arrangement, by the action of the springs 9, 9', returns to the position shown in Figure 7, in which the orifices 18, 18' are closed, thereby retaining the pressure fluid behind the piston 4, until the instant when the supply takes place through the orifice 15' and the whole sliding arrangement moves this time towards the right, during which movement the above-described operations for the other clutch occur in the same order.

An improvement similar to that shown in Figure 6 may easily be incorporated in the third embodiment described. To this end, the distance separating the heads 25, 25', 26, 26' of the rods 23, 23' is so selected that, at its rest position, the valve 7 uncovers the supply orifice 18, thus allowing the direct introduction of the actuating fluid to the chamber behind the piston 14.

It will be evident that numerous constructional modifications can be made to the various elements of the devices described, and also to their reciprocal arrangement, all within the scope of the appended claims.

Having now particularly described and ascertained the nature of my said invention and in what manner the same is to be performed, I declare that what I claim is:

1. In a device for supplying and discharging pressure fluid to and from a group of two clutches having hydraulically engaged discs, wherein the clutches act in succession thereby to ensure overlap in the engagement thereof, the provision of a pair of slide valves arranged with parallel axes, each associated with one of the clutches to control the supply and the discharge of fluid to and from the associated clutch, a pivoted rocker having an arm operatively engaged directly with one end of each valve, and a calibrated return spring operatively connected to the opposite end of each valve and yieldably urging the associated valve in opposition to actuation by said rocker, which is thus responsive to movement of one of the valves from discharge to supply position, to move the other valve from supply to discharge position.

2. In a device as claimed in claim 1, wherein each clutch comprises a pressure chamber having an inlet port and an outlet port for pressure fluid, the improvement wherein each valve is slidable in a sleeve having a supply port and a discharge port, the supply and discharge ports communicating respectively with the inlet and outlet ports of the associated clutch chamber, the length of the valves and the distance between the supply and discharge ports thereof being so calculated that the valve of the clutch to be engaged, upon actuation from discharge to supply position, opens the supply port thereof before the valve of the clutch to be released, upon actuation by the rocker, opens the discharge port thereof.

3. A device as claimed in claim 1, further comprising a movable mass in radial alignment with the pivot of the rocker, and displaceable by centrifugal force when the clutches rotate, said rocker being provided at each side of the pivot with an inclined surface portion cooperating with said mass, the centrifugal force exerted by said mass upon said inclined portions being such as to compensate the difference of centrifugal forces exerted upon the arms of said rocker by said valves, when not equidistant from the axis of rotation of the clutches.

4. A device as claimed in claim 1, further comprising an abutment ring between each valve and the associated return spring, a predetermined amount of lost motion being provided between the valve ends and the rings, thereby to enable opening of the supply and closing of the delivery ports of one clutch, prior to compression of the spring of the other clutch.

HENRI GRANDGIRARD.

REFERENCES CITED

The following references are of record in the file of this patent:

UNITED STATES PATENTS

| Number | Name | Date |
|---|---|---|
| 942,065 | Grebel | Dec. 7, 1909 |
| 2,375,440 | Roche | May 8, 1945 |

OTHER REFERENCES

Ser. No. 400,817, Maybach (A. P. C.), published May 18, 1943.